(12) United States Patent
Ferguson et al.

(10) Patent No.: US 12,439,185 B2
(45) Date of Patent: Oct. 7, 2025

(54) CONFIGURATION PAGE NOTIFICATION ITEMS BASED ON ENVIRONMENTAL CONDITIONS

(71) Applicant: Hewlett-Packard Development Company, L.P., Spring, TX (US)

(72) Inventors: Kathryn J Ferguson, Boise, ID (US);
Manjunath Bhuyar, Boise, ID (US);
Sheela Choudhari, Boise, ID (US);
Anton Wiranata, Boise, ID (US);
Kenneth K Smith, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/032,174

(22) PCT Filed: Oct. 27, 2020

(86) PCT No.: PCT/US2020/057545
§ 371 (c)(1),
(2) Date: Apr. 15, 2023

(87) PCT Pub. No.: WO2022/093198
PCT Pub. Date: May 5, 2022

(65) Prior Publication Data
US 2023/0396900 A1    Dec. 7, 2023

(51) Int. Cl.
*H04Q 9/00*     (2006.01)
*G01D 1/18*     (2006.01)

(52) U.S. Cl.
CPC ............... *H04Q 9/00* (2013.01); *G01D 1/18* (2013.01); *H04Q 2209/823* (2013.01)

(58) Field of Classification Search
CPC ....... H04Q 9/00; H04Q 2209/823; G01D 1/18
See application file for complete search history.

(56) References Cited

U.S. PATENT DOCUMENTS

| 9,007,225 B2 | 4/2015 | Kates |
| 9,524,132 B2 | 12/2016 | Weaver et al. |
| 9,686,743 B2 | 6/2017 | Lacatus et al. |

(Continued)

FOREIGN PATENT DOCUMENTS

| CN | 107036656 A | 8/2017 |
| CN | 107251530 A | 10/2017 |
| WO | 2016/111916 A1 | 7/2016 |

*Primary Examiner* — Amine Benlagsir
(74) *Attorney, Agent, or Firm* — Michael Dryja

(57) ABSTRACT

According to examples, an apparatus may include a processor that may receive an environmental condition detected at an electronic device and may determine whether the received environmental condition is outside of a predefined threshold range for the electronic device. The processor may, based on a determination that the received environmental condition is outside of the predefined threshold range for the electronic device, generate a notification item in a configuration page of the electronic device indicating that the electronic device has operated in an environmental condition that is outside of the predefined threshold range for the electronic device. The processor may also store the generated notification item in the configuration page of the electronic device, in which a service agent of the electronic device is to access the notification item in the configuration page stored in the electronic device.

4 Claims, 4 Drawing Sheets

(56) References Cited

U.S. PATENT DOCUMENTS

| | | | |
|---|---|---|---|
| 11,333,562 B1* | 5/2022 | Johnson | G01K 13/20 |
| 11,910,497 B2* | 2/2024 | Meyers | H05B 3/84 |
| 2012/0167882 A1* | 7/2012 | Wood | A61B 1/128 |
| | | | 128/204.17 |
| 2015/0083044 A1 | 3/2015 | Nielsen et al. | |
| 2016/0071183 A1* | 3/2016 | Joshi | G06Q 30/0631 |
| | | | 705/26.7 |
| 2016/0124830 A1 | 5/2016 | Banerjee et al. | |
| 2019/0245836 A1 | 8/2019 | Erickson et al. | |
| 2020/0124459 A1 | 4/2020 | Glenn et al. | |
| 2021/0375115 A1* | 12/2021 | Roy | G08B 27/005 |

\* cited by examiner

CONFIGURATION PAGE NOTIFICATION ITEMS BASED ON ENVIRONMENTAL CONDITIONS

BACKGROUND

When electronic devices experience issues such as malfunctions or otherwise become impaired, users may contact a service call center to identify and correct the issues. A service agent of the service call center may run through a number of considerations in identifying and correcting the issues. In some instances, the service agent may consume a great detail of time in running through the number of considerations.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
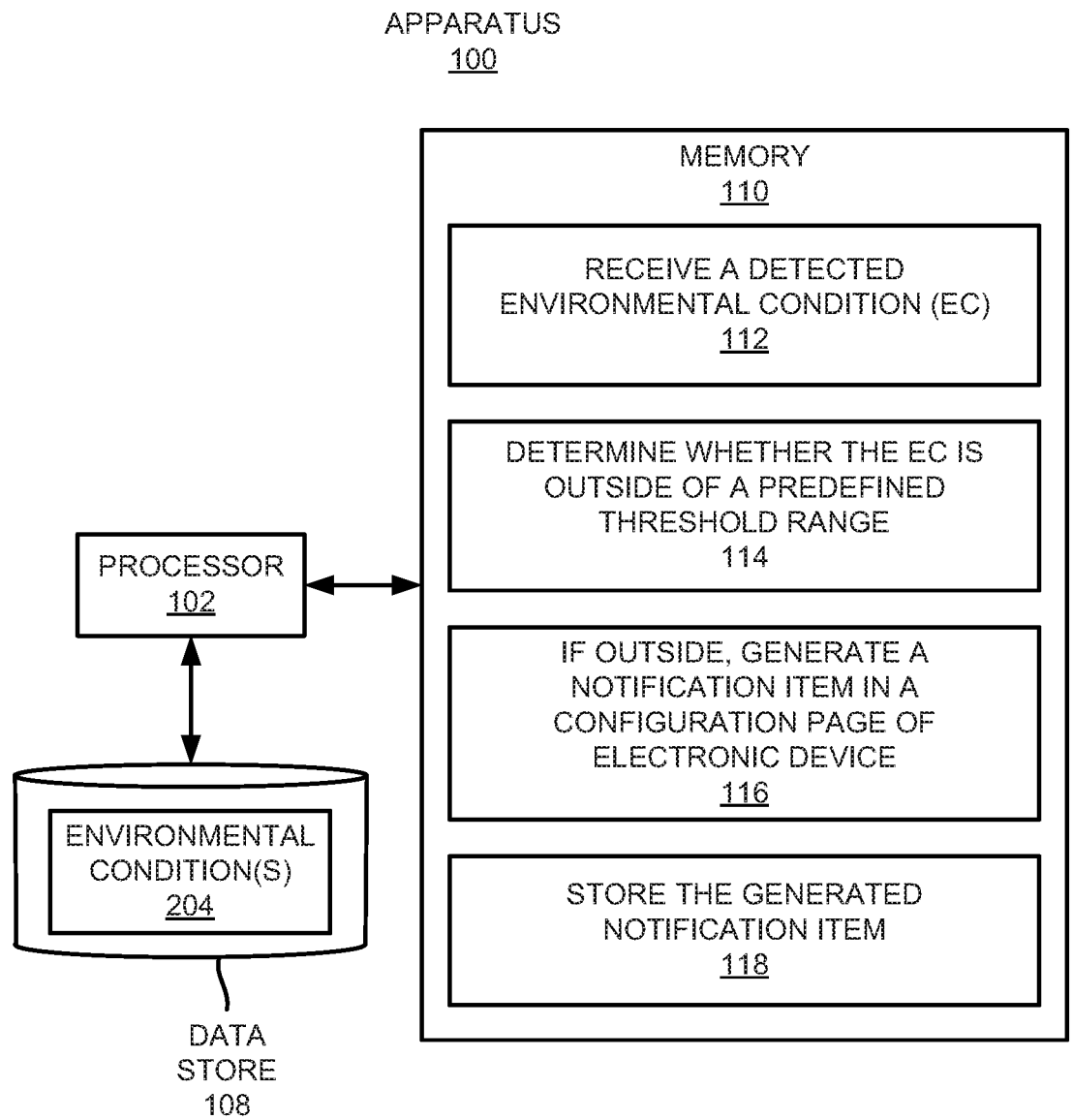
FIG. 1 shows a block diagram of an example apparatus that may generate a notification item in a configuration page of an electronic device indicating that the electronic device has operated in a detected environmental condition that is outside of a predefined threshold range for the electronic device.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Electronic devices, such as printers, computing devices, and/or the like, may be designed and manufactured to operate within certain environmental condition ranges. When the electronic devices are operated outside of those certain environmental condition ranges for periods of time, the electronic devices may perform below intended operating conditions, may become damaged, and/or the like. Additionally, when the electronic devices are later operated within the certain environmental condition ranges, the electronic devices may operate sub-optimally. A technical issue associated with troubleshooting electronic devices may be that it may be difficult for a service agent to identify when an electronic device may have issues due to the electronic device being operated in an adverse environment and thus, the service agent may cause a processor to consume processing resources and energy in maintaining a service call with a user of the electronic device. The electronic device may also be unusable for a long period of time while the electronic device is not operating properly.

Disclosed herein are apparatuses, methods, and computer-readable media that may digitally indicate that an electronic device, with which the apparatuses and computer-readable media may communicate over a network, has been operated outside of a predefined environmental threshold range for the electronic device. The digital indication may be made each time the electronic device is determined to have been operated outside of the predefined environmental threshold range. In addition, or alternatively, the digital indication may be made when it is determined that the electronic device has been operated outside of the predefined environmental threshold range for at least a predefined period of time.

In some examples, a service agent, e.g., of a service call center, may access the digital indication that the electronic device has been operated outside of the predefined environmental threshold range for the electronic device. The service agent may thus determine whether the electronic device has been operated outside of the predefined environmental threshold range for the electronic device and may use that determination in troubleshooting an issue with the electronic device when the electronic device experiences such an issue, such as a fault, inefficient operations, and/or the like. That is, the service agent may determine from the digital indication as to whether operation of the electronic device outside of the predefined environmental threshold range may have caused the issue. A technical improvement afforded through implementation of the features of the present disclosure may be that the processing resources and energy consumed in troubleshooting an electronic device may be reduced as a service agent may more quickly determine that operation of the electronic device outside of the predefined threshold range may have caused the issue or may rule out that possibility.

According to examples of the present disclosure, a processor may receive, over a network and/or directly, an environmental condition detected at an electronic device and may determine whether the received environmental condition is outside of a predefined threshold range for the electronic device. Based on a determination that the received environmental condition is outside of the predefined threshold range for the electronic device (and/or that the multiple received environmental conditions are outside of the predefined threshold range for the electronic device for at least a predefined period of time), the processor may generate a notification item for a configuration page of the electronic device, in which the notification item may indicate that the electronic device has operated in an environmental condition that is outside of the predefined threshold range for the electronic device. In addition, the processor may cause to be stored or otherwise output the generated notification item, which may be a digital indication that the electronic device has been operated outside of the predefined threshold range for the electronic device to the electronic device. In some examples, a service agent of the electronic device may access the notification item in the configuration page stored in the electronic device, e.g., via a web portal.

Figure 2:
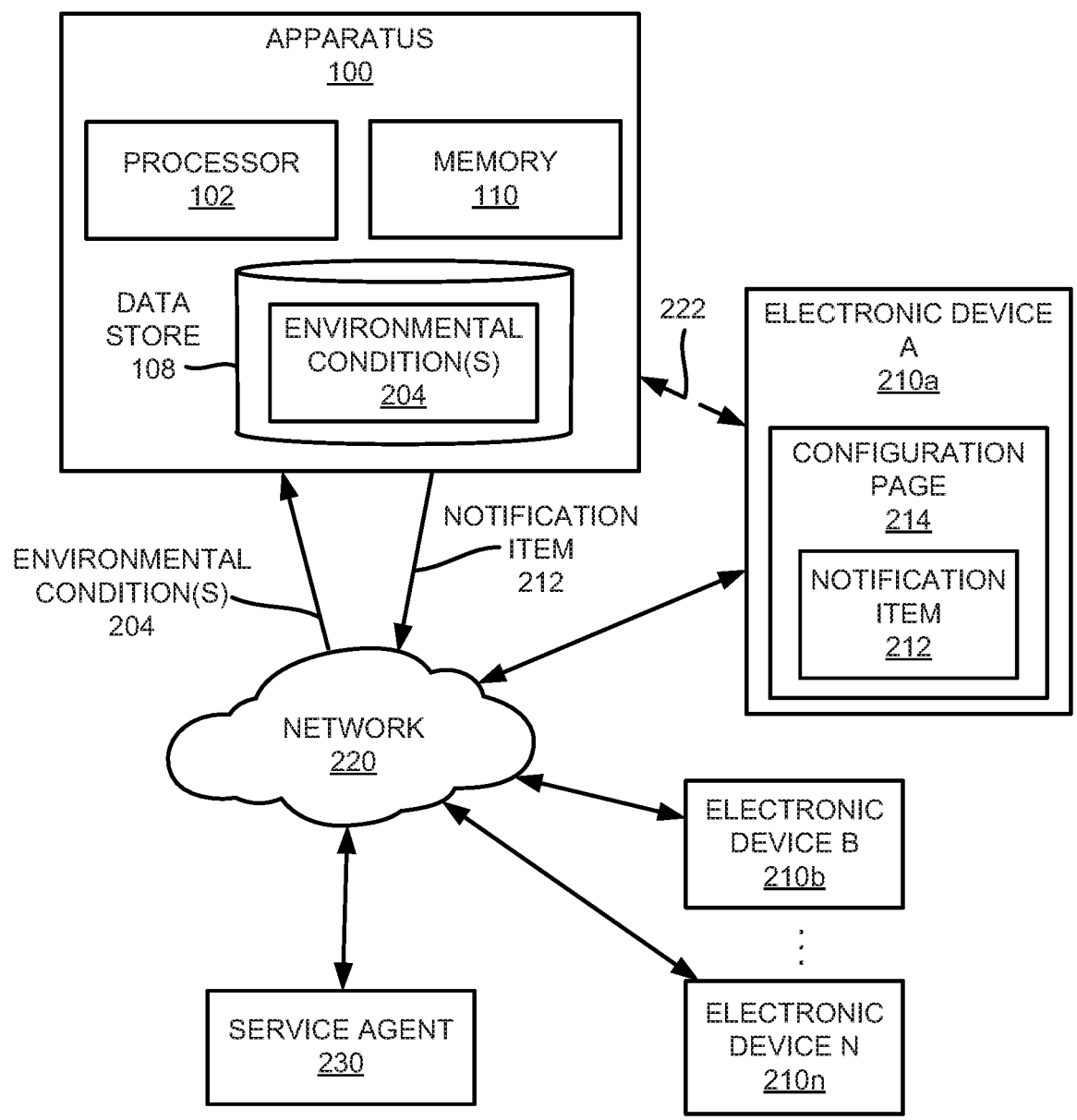
FIG. 2 depicts a block diagram of the example apparatus depicted in FIG. 1.

Reference is first made to FIGS. 1 and 2. FIG. 1 shows a block diagram of an example apparatus 100 that may generate a notification item 212 in a configuration page 214 of an electronic device 210a indicating that the electronic device 210a has operated in a detected environmental condition that is outside of a predefined threshold range for the electronic device 210a. FIG. 2 shows an example network environment 200, in which the example apparatus 100 depicted in FIG. 1 may be implemented. It should be understood that the apparatus 100 and the network environment 200 may include additional features and that some of the features described herein may be removed and/or modified without departing from the scopes of the apparatus 100 and/or the network environment 200.

According to examples, the apparatus 100 may be a server or other type of computing device that may be in the "cloud" and may communicate with electronic devices 210a-210n over a network 220. In other examples, the apparatus 100 may be a computing device that may be on the edge of the network 220 and/or may be components within an electronic device 210a. In these examples, the processor 102 of the apparatus 100 may communicate directly (or over a local area network) with the electronic device 210a as denoted by the dashed arrow 222. The electronic devices 210a-210n, in which the variable "n" may represent a value greater than one, may each be, for instance, a two-dimensional printer, a three-dimensional printer, a laptop computer, a desktop computer, a tablet computer, a smartphone, and/or the like. The electronic devices 210a-210n may each be the same type of device or some of the electronic devices 210a-210n may be different types of devices with respect to each other. The network 220 may be the Internet, a wide area network, a cellular network, and/or the like, and the apparatus 100 may communicate with the electronic devices 210a-210n through a wired and/or a wireless connection over the network 220.

The apparatus 100 may include a processor 102 that may control operations of the apparatus 100 and a memory 110 on which data that the processor 102 may access and/or may execute may be stored. The processor 102 may be a semiconductor-based microprocessor, a central processing unit (CPU), an application specific integrated circuit (ASIC), a field-programmable gate array (FPGA), and/or other hardware device. The memory 110, which may also be termed a computer readable medium, may be, for example, a Random Access memory (RAM), an Electrically Erasable Programmable Read-Only Memory (EEPROM), a storage device, or the like. The memory 110 may be a non-transitory computer readable storage medium, where the term "non-transitory" does not encompass transitory propagating signals. In any regard, the memory 110 may have stored thereon machine-readable instructions that the processor 102 may execute.

Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and multiple memories 110. In addition, or alternatively, the processor 102 and the memory 110 may be integrated into a single component, e.g., an integrated circuit on which both the processor 102 and the memory 110 may be provided. In addition, or alternatively, the operations described herein as being performed by the processor 102 may be distributed across multiple apparatuses 100 and/or multiple processors 102.

As shown in FIG. 2, the memory 110 may have stored thereon machine-readable instructions 112-118 that the processor 102 may execute. Although the instructions 112-118 are described herein as being stored on the memory 110 and may thus include a set of machine-readable instructions, the apparatus 100 may include hardware logic blocks that may perform functions similar to the instructions 112-118. For instance, the processor 102 may include hardware components that may execute the instructions 112-118. In other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 2.

The processor 102 may execute the instructions 112 to receive an environmental condition 204 (or multiple environmental conditions) detected at an electronic device 210a. As shown in FIG. 2, the processor 102 may receive the environmental condition(s) 204 over the network 220. In other examples, the processor 102 may receive the environmental condition(s) 204 directly as denoted by the arrow 222. The environmental condition may include temperature, humidity, relative humidity, pressure, air flow velocity, and/or the like. In some examples, the electronic device 210a may include a sensor and/or multiple sensors that may detect the environmental condition in and/or around the electronic device 210a. In other examples, the sensor(s) may be positioned outside of the electronic device 210a and may detect an ambient environmental condition (or conditions) around the electronic device 210a.

The electronic device 210a may also communicate the detected environmental condition(s) 204 to the apparatus 100 over the network 220 or directly. For instance, the electronic device 210a may be programmed to detect the environmental condition(s) 204 at certain intervals of time, when certain actions occur, when manually instructed to do so, etc. The electronic device 210a may be programmed to detect the environmental condition(s) 204 at hourly intervals, at daily intervals, at weekly intervals, and/or the like. In addition, or alternatively, the electronic device 210a may be programmed to detect the environmental condition(s) 204 when the electronic device 210a is activated from a sleep or a power off state, when the electronic device 210a performs some function, e.g., a printing function, a scanning function, etc., and/or the like. The electronic device 210a may also communicate the detected environmental condition(s) 204 at certain intervals of time, when certain actions occur, when manually instructed to do so, etc.

The processor 102 may store some or all of the received environmental condition(s) 204 from the electronic device 210a in a data store 108 as shown in FIGS. 1 and 2. The data store 108 may be a Random Access memory (RAM), an Electrically Erasable Programmable Read-Only Memory (EEPROM), a storage device, or the like. The other electronic devices 210b-210n may function similarly to the electronic device 210a, e.g., may detect and send the detected environmental conditions 204 to the apparatus 100, and the processor 102 may also store the environmental condition(s) 204 received from the other electronic devices 210b-210n in the data store 108.

The processor 102 may execute the instructions 114 to determine whether the received environmental condition 204 is outside of a predefined threshold range for the electronic device 210a. The predefined threshold range for the electronic device 210a may be defined as a range of environmental condition values at which the electronic device 210a is known or is predicted to operate within certain parameters. For instance, the predefined threshold range may be a range of environmental condition values at which the electronic device 210a may be known to operate as intended by the manufacturer of the electronic device 210a. In some examples, the predefined threshold range may have a time component such that, for instance, the processor 102 may determine that multiple ones of the received environmental condition over a certain period of time are outside of the predefined threshold range for the electronic device 210.

The predefined threshold range for the electronic device 210a may be determined in any suitable manner, e.g., through testing and/or modeling of the electronic device 210a or devices similar to the electronic device 210a under various environmental conditions. The manufacturer of the electronic device 210a may perform the testing and may provide the predefined threshold range to the apparatus 100 in some examples, while in other examples, an operator of the apparatus 100 may perform the testing. In some examples, the processor 102 may update the predefined threshold range for the electronic device 210a based on updated information about the electronic device 210a.

In any of these examples, the predefined threshold range for the electronic device 210a may be stored in the data store 108 and the processor 102 may access the predefined threshold range for the electronic device 210a from the data store 108 in determining whether the received environmental condition of the electronic device 210a is outside of the predefined threshold range for the electronic device 210a. In other examples, the predefined threshold range for the electronic device 210a may be stored elsewhere, e.g., on a network storage device, on an external website, and/or the like, and the processor 102 may access the predefined threshold range for the electronic device 210a from the outside storage location. In any of these examples, the predefined threshold range may differ for different types of the electronic devices 210a-210n.

By way of particular example in which the environmental condition is temperature, the predefined threshold range for the electronic device 210a may be between around 20 degrees Celsius and around 40 degrees Celsius. As another particular example in which the environmental condition is relative humidity, the predefined threshold range for the electronic device 210a may be between around 40% and around 60%.

The processor 102 may execute the instructions 116 to, based on a determination that the received environmental condition is outside of the predefined threshold range for the electronic device 210a, generate a notification item 212 in a configuration page 214 of the electronic device 210a. The notification item 212 may be an item, e.g., a message, text, etc., that may indicate that the electronic device 210a has operated in an environmental condition that is outside of the predefined threshold range for the electronic device 210a. The configuration page 214 of the electronic device 210a may be a page of data that may be stored locally on the electronic device 210a and may include information pertaining to various features of the electronic device 210a. For instance, the configuration page 214 may include information about the electronic device 210a, such as error logs, firmware version installed, memory, hardware installed, operating system, and/or the like. The configuration page 214 may be printed, accessible via a display on or attached to the electronic device 210a, accessible via a web page, and/or the like.

The processor 102 may execute the instructions 118 to store the generated notification item 212 in the configuration page of the electronic device 210a. The notification item 212 may be an entry that the processor 102 may communicate to the electronic device 210a to add to the configuration page 214 either over the network 220 or through a direct connection with the electronic device. In response to receipt of the notification item 212, the notification item 212 may be added to the configuration page 214 of the electronic device 210a.

According to examples, a service agent 230 of the electronic device 210a may access the notification item 212 in the configuration page 214 stored in the electronic device 210. The service agent 230 may be, for instance, an agent of a help desk service to which a user of the electronic device 210a may contact responsive to an issue occurring with the electronic device 210a. The service agent 230 may access the configuration page 214 of the electronic device 210a over the network 220, e.g., via a web browser or other portal. In addition, the service agent 230 may determine that the electronic device 210a may have been operated in an environmental condition that is outside of the predefined threshold range for the electronic device 210a from the notification item 212 in the configuration page 214.

The service agent 230 may use the information in the notification item 212 to troubleshoot the electronic device 210a, which may enable the service agent 230 to determine that an issue with the electronic device 210a may be caused by the operation of the electronic device 210a in an environmental condition that is outside of the predefined threshold range for the electronic device 210a. Likewise, the service agent 230 may use the information in the notification item 212, or a lack of the notification item 212 in the configuration page 214 of the electronic device 210a to determine that the electronic device 210a may not have been operated in such an environment and may thus rule that out as a possible cause of the issue on the electronic device 210a.

The addition of the notification item 212 in the configuration page 214 may enable the service agent 230 to more quickly diagnose and/or resolve the issue on the electronic device 210a, which may reduce the amount of computing resources and power that the service agent 230 may consume in resolving the issue on the electronic device 210a. This may also enable the issues to be resolved with lower costs.

According to examples, the processor 102 may additionally or alternatively generate the notification item 212 as an entry into a copy of the configuration page 214 of the electronic device 210a. In these examples, the copy of the configuration page 214 of the electronic device 210a may be stored externally from the electronic device 210a. For instance, the copy of the configuration page 214 may be stored on the data store 108, a network storage device, and/or the like. In addition, the service agent 230 may access the copy of the configuration page 214 of the electronic device 210a and the notification item 212 from the copy, for instance, when the service agent 230 is troubleshooting the electronic device 210a.

According to examples, based on a determination that the received environmental condition is outside of the predefined threshold range for the electronic device 210a, the processor 102 may generate a second notification item (not shown) and may output the generated second notification item. The second notification item may include a notification for a user to take an action on the electronic device 210a. For instance, the second notification item may include a notification for the user to move the electronic device 210a to an area that is within the predefined threshold range for the electronic device 210a, to increase a cool down cycle of the electronic device 210a, to slow a print speed, to use different paper type settings, and/or the like. The second notification item may be communicated to the electronic device 210a as a notification on a display panel or screen of the electronic device 210a. In addition, or alternatively, the second notification item may be communicated as an email message, a text message, and/or the like.

According to examples, the processor 102 may additionally generate and send an instruction signal for the electronic device 210a to modify an operation of the electronic device 210a based on the determination that the received environmental condition is outside of the predefined threshold range for the electronic device 210a. The instruction signal may cause the electronic device 210a to modify its operation such that, for instance, the electronic device 210a may have improved operations while being within an environmental condition that is outside of the predefined threshold range. By way of example, the instruction signal may cause the electronic device 210 to increase a cool down cycle, to activate a heater, to increase a fan speed/duration, to decrease a print speed, to modify a print mode, and/or the like.

According to examples, the processor 102 may determine whether the received environmental condition is outside of a second predefined threshold range for the electronic device 210a. The second predefined threshold range may be outside of the predefined threshold range for the electronic device 210a and the processor 102 may make this determination based on a determination that the received environmental condition is outside of the predefined threshold range. The second predefined threshold range may be determined in any of the manners discussed above with respect to the predefined threshold range. In these examples, based on a determination that the received environmental condition is outside of the second predefined threshold range, the processor 102 may generate and send an instruction signal for the electronic device 210a to modify an operation of the electronic device 210a. The instruction signal may cause the electronic device 210a to modify its operation.

Figure 3:
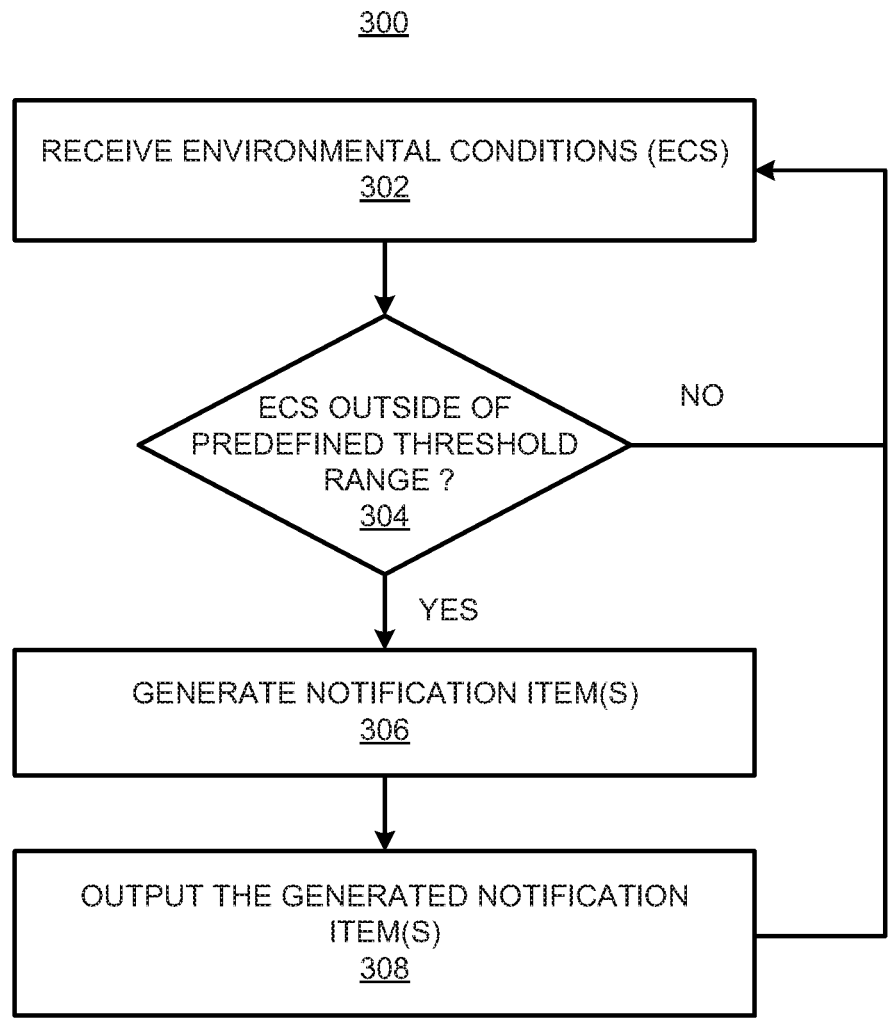
FIG. 3 depicts a flow diagram of a method for generating a notification item in a configuration page of a printer indicating that the printer has operated in a detected environmental condition that is outside of a predefined threshold range for the electronic device.

In some examples, the processor 102 may receive a plurality of environmental conditions detected at the electronic device 210a over a period of time. In addition, the processor 102 may determine whether any of the received plurality of environmental conditions is outside of the predefined threshold range for the electronic device 210a. The processor 102 may also generate a notification item 212 in the configuration page 214 of the electronic device 210a for each of the received environmental conditions that exceeds the predefined threshold range. In addition or alternatively, the processor 102 may determine a period of time at which the electronic device 210a has been operating in an environmental condition that is outside of the predefined threshold range from the received environmental conditions. In these examples, the processor 102 may determine whether the determined period of time exceeds a predefined period of time, and if so, the processor 102 may generate the notification item in the configuration page of the electronic device 210a. The predefined period of time may be user-defined, defined by a manufacturer of the electronic device 210a, based on a testing, modeling, etc., Various manners in which the processor 102 of the apparatus 100 may operate are discussed in greater detail with respect to the method 300 depicted in FIG. 3. Particularly, FIG. 3 depicts a flow diagram of a method 300 for generating a notification item 212 in a configuration page 214 of a printer 210a indicating that the printer 210a has operated in a detected environmental condition that is outside of a predefined threshold range for the electronic device 210a. It should be understood that the method 300 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive, over a network 220, environmental conditions detected at a printer 210a over a period of time. That is, the printer 210a may send the detected environmental conditions to the apparatus 100 over the period of time, e.g., over a couple of hours, a couple of days, etc. At block 304, the processor 102 may determine whether any of the received environmental conditions is outside of a predefined threshold range for the printer 210a. Based on a determination that none of the received environmental conditions is outside of the predefined threshold range for the printer 210a, the processor 102 may continue to receive the environmental conditions from the printer 210a. The printer may be a 2D printer, a 3D printer, a laser printer, an inkjet printer, and/or the like.

However, based on a determination that any of the received environmental conditions is outside of the predefined threshold range at block 304, the processor 102 may generate a notification item 212 indicating that the printer 210a has operated in an environmental condition that is outside of the predefined threshold range for the printer 210a. In some examples, the processor 102 may generate a notification item 212 for each of the received environmental conditions that is determined to be outside of the predefined threshold range for the printer 210a. In addition or alternatively, the processor 102 may generate the notification item 212 based on the printer 210a being outside of the predefined threshold range for at least a predefined period of time.

At block 308, the processor 102 may output the generated notification item(s) 212 as an entry in a configuration page 214 stored locally on the printer 210a. As discussed herein, a service agent 230 may access the generated notification item 212 from the configuration page 214 stored locally on the printer 210a.

According to examples, the processor 102 may determine whether any of the received environmental conditions is outside of a second predefined threshold range for the printer 210a based on a determination that the received environmental condition is outside of the predefined threshold range for the printer 210. In addition, for the received environmental conditions that are determined to be outside of the second predefined threshold range, the processor 102 may generate an instruction signal for the printer 210a to modify an operation of the printer 210a. The processor 102 may also send the generated instruction signal to the printer 210a and the printer 210a may execute the operation identified in the instruction signal.

According to examples, the processor 102 may generate and send a second notification item as a notification for a user to take an action on the printer 210a. As discussed herein, the second notification item may be communicated to the user via an instruction displayed on a control panel and/or a display of the printer 210a. In addition, or alternatively, the second notification item may be communicated to the user via an email, a text message, and/or the like.

Some or all of the operations set forth in each of the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
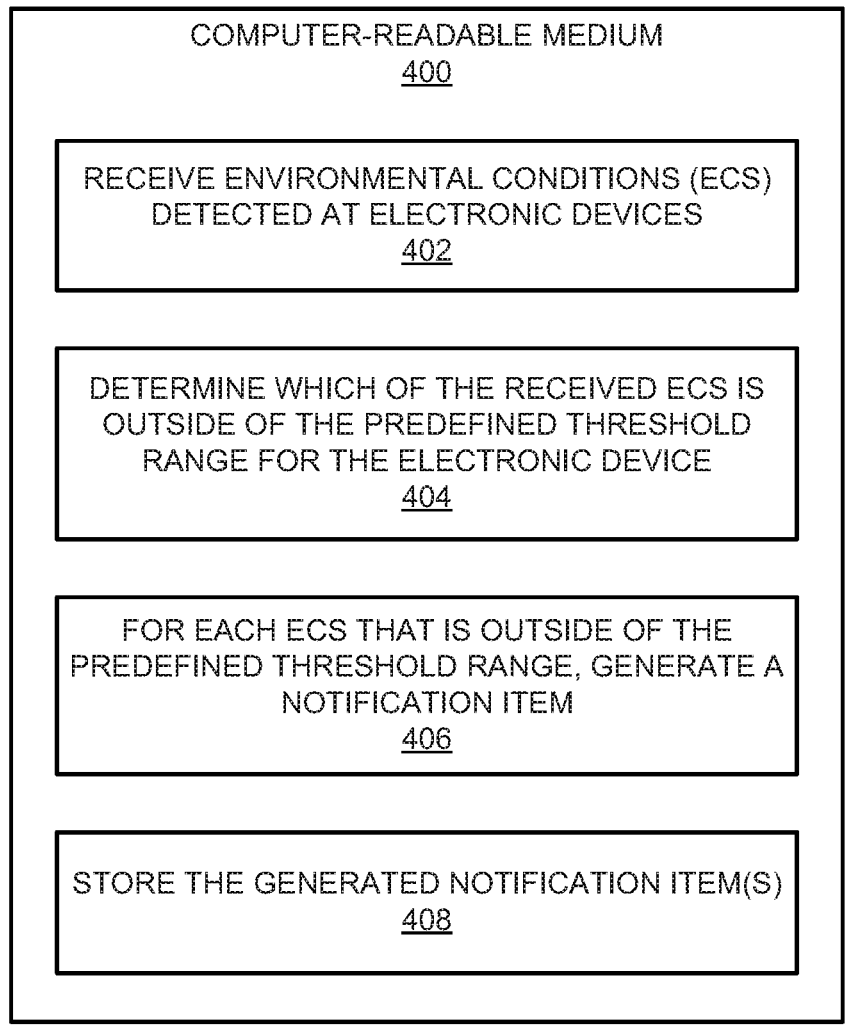
FIG. 4 depicts a block diagram of a computer-readable medium that may have stored thereon computer-readable instructions for generating a notification item in a configuration page of an electronic device indicating that the electronic device has operated in a detected environmental condition that is outside of a predefined threshold range for the electronic device.

Turning now to FIG. 4, there is shown a block diagram of a computer-readable medium 400 that may have stored thereon computer-readable instructions for generating a notification item 212 in a configuration page 214 of an electronic device 210a, in which the notification item 212 may indicate that the electronic device 210a has operated in a detected environmental condition that is outside of a predefined threshold range for the electronic device 210a. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-408 that a processor, such as the processor 102 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to receive, over a network, environmental conditions detected at a plurality of electronic devices 210a-210n. The processor may fetch, decode, and execute the instructions 404 to determine which of the received environmental conditions is outside of a respective predefined threshold range for the electronic device 210a. The processor may fetch, decode, and execute the instructions 406 to, for each of the plurality of electronic devices 210a-210n for which a received environmental condition is determined to be outside of the respective predefined threshold range for the electronic device 210a-210m, generate a notification item 212 indicating that the electronic device 210a-210n has operated in an environmental condition that is outside of the predefined threshold range for the electronic device 210a-210n. In addition, the processor may fetch, decode, and execute the instructions 408 to store the generated notification item(s) 212 as an entry in a configuration page 214 stored locally on the electronic device 210a-210n. As discussed herein, a service agent 230 may access the generated notification item 212 from the configuration page 214 stored locally on the electronic device 210a-210n.

In some examples, the processor may update the predefined threshold ranges for the electronic devices 210a-210n over time, for instance, as additional information about the electronic devices 210a-210n becomes available.

In some examples, the processor may determine whether any of the received environmental conditions that are determined to be outside of the respective predefined threshold range for the electronic device 210a-210n is outside of a respective second predefined threshold range for the electronic device 210a-210n. The processor may also, for each of the plurality of electronic devices 210a-210n for which a received environmental condition is outside of the second predefined threshold range, generate an instruction signal for the electronic device 210a-210n to modify an operation of the electronic device 210-210n and send the generated instruction signal to the electronic device 210-210n.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method performed by a computing device and comprising:
    receiving, from a printer and over a network, a plurality of environmental conditions detected at the printer over a period of time and during operation of the printer, wherein the computing device is not the printer;
    determining that at least one of the environmental conditions is outside of a predefined threshold range for the printer;
    in response to determining that the at least one of the environmental conditions is outside of the predefined threshold range, generating, a notification item of a plurality of notification items to add to a configuration page of the printer, wherein the configuration page is locally stored in the printer, and the notification item indicates that the printer has operated in the at least one of the environmental conditions outside of the predefined threshold range; and
    sending, over the network and to the printer, the notification item to add to the configuration page locally stored in the printer, wherein the configuration page is accessible within the printer by a service agent of the printer.

2. The method of claim 1, further comprising:
    generating each notification item of the plurality of notification items for each of the at least one of the environmental conditions outside of the predefined threshold range for the printer; and
    outputting said each notification item for said each of the at least one of the environmental conditions.

3. The method of claim 1, wherein the predefined threshold range is a first predefined threshold range, the method further comprising:
- determining that one or more of the environmental conditions are outside of a second predefined threshold range for the printer;
- in response to determining that the one or more of the environmental conditions are outside of the second predefined threshold range,
- generating an instruction signal for the printer to modify the operation of the printer; and
- sending the instruction signal to the printer.

4. The method of claim 1, further comprising:
- generating a second notification item for a user to take an action on the printer; and
- outputting the second notification item.

\* \* \* \* \*